No. 834,394. PATENTED OCT. 30, 1906.
J. C. METCALF.
REVERSING MECHANISM FOR TRACTION ENGINES.
APPLICATION FILED NOV. 16, 1905.

Witnesses

Inventor
John C. Metcalf
by A. B. Wilson
Attorney

UNITED STATES PATENT OFFICE.

JOHN C. METCALF, OF MERCERSBURG, PENNSYLVANIA.

REVERSING MECHANISM FOR TRACTION-ENGINES.

No. 834,294.			Specification of Letters Patent.			Patented Oct. 30, 1906.

Application filed November 16, 1905. Serial No. 287,750.

*To all whom it may concern:*

Be it known that I, JOHN C. METCALF, a citizen of the United States, residing at Mercersburg, in the county of Franklin and State of Pennsylvania, have invented certain new and useful Improvements in Reversing Mechanism for Traction-Engines; and I do declare the following to be a full, clear, and exact description of the invention, such as will enable others skilled in the art to which it appertains to make and use the same.

This invention relates to improvements in reversing mechanism for traction-engines.

The object of the invention is to provide a device of this character by which the shaft or axle of the traction-engine may be quickly and easily reversed.

A further object is to provide an improved construction of clutch adapted to be used in connection with the reversing mechanism.

With the above and other objects in view the invention consists of certain novel features of construction, combination, and arrangement of parts, as will be hereinafter described and claimed.

Figure 1:
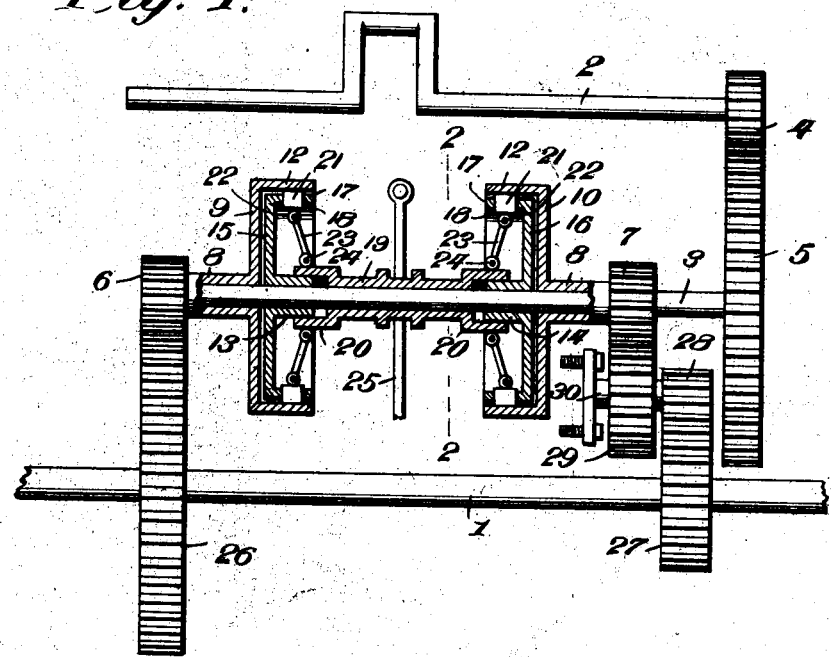
Figure 2:
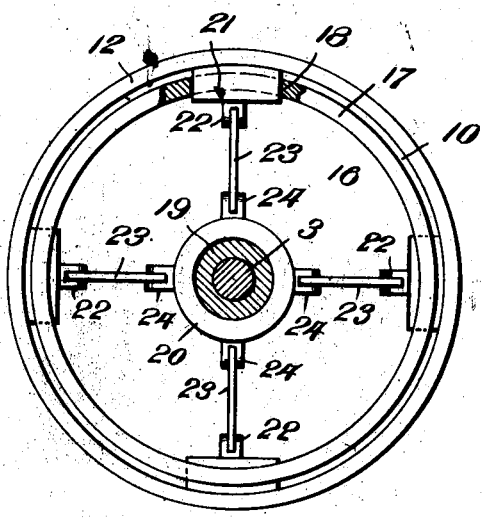

In the accompanying drawings, Figure 1 is a diagrammatic plan view, partly in section, of a reversing mechanism constructed and arranged in accordance with the invention; and Fig. 2 is a sectional view through one of the clutches on the line 2 2 of Fig. 1.

Referring more particularly to the drawings, 1 denotes the axle or shaft of the engine, 2 denotes the main drive-shaft, which is here shown as a crank-shaft, and 3 denotes the counter-shaft arranged between said main drive-shaft and the axle. On the main drive-shaft 2 is fixedly mounted a spur gear-pinion 4, which is adapted to mesh with a spur gear-wheel 5, fixedly mounted on one end of the counter-shaft 3, as shown. Loosely mounted upon the counter-shaft 3, adjacent to each end of the same, are pinions 6 and 7, said pinions being provided with elongated hubs 8, to which are rigidly secured stationary clutch members 9 and 10. Said clutch members are here shown and are preferably constructed in the form of circular disks, from the inner side of which project integral right-angularly-disposed annular flanges 12.

On the counter-shaft 3, adjacent to the stationary clutch members 9 and 10, are hubs 13 and 14, on the outer ends of which are rigidly connected circular guide plates or disks 15 and 16. On the outer edges of these guide plates or disks are arranged integrally-formed right-angularly-disposed annular flanges 17, in which are formed a series of radially-disposed apertures or passages 18.

Slidably mounted upon the counter-shaft 3 to turn therewith is a clutch-sleeve 19, provided on its opposite ends with annular enlargements, in which are formed annular sockets or recesses 20 to engage the hubs 13 and 14 of the plates or disks 15 and 16, whereby said sleeve may be shifted on the shaft 3 and over said hubs 13 and 14. In the apertures or passages 18 of the flange 17 are arranged slidably-mounted segmental clutch blocks or shoes 21, on the inside of which are formed ears or lugs 22. To these ears or lugs 22 are pivotally connected the outer ends of links 23, the inner ends of which are pivotally connected to ears or lugs 24, formed on the enlarged ends of the sleeve 19. The links 23 are of such length that when the sleeve 19 is shifted toward one or the other of the clutch members 9 or 10 the blocks 21, connected to the outer ends thereof, will be forced into frictional engagement with the inner side of the flanges 12 on the clutch members 9 and 10, thus locking one or the other of said clutch members and the pinion connected thereto into working engagement with the counter-shaft 3, as will be understood. The sleeve 19 may be shifted in any suitable manner, the same being here shown as provided with an annular groove adapted to be engaged by a shifting-lever 25.

Mounted on the shaft or axle 1 is a gear-wheel 26, adapted to engage the pinion 6 of the clutch member 19. On the axle 1 is also fixedly mounted a spur gear-wheel 27, which is adapted to engage the pinion 28 of a combined idle spur gear-wheel and pinion 29, mounted on a stub-shaft 30, which is secured in a suitable position on the frames of the machine. The spur gear-teeth of the combined wheel 29 are adapted to mesh with the pinion 7 of the clutch member 10, whereby when the clutch-sleeve 19 is shifted to lock said clutch member 10 and the pinion 7 into engagement with the counter-shaft said axle will be driven in one direction and when the sleeve 19 is shifted to lock the clutch member 19 and gear-wheel 6 into working engagement with the shaft 3 said axle, through the gear-wheel 26, will be driven in the opposite direction.

A reversing mechanism and clutch, constructed as herein shown and described, will be simple, strong, and durable in construction, efficient in operation, and may be located at any convenient point on the machine, but is preferably arranged below the same.

While I have here shown and described the connecting-gearing in the form of spur-gears, it is obvious that sprocket-gears or other suitable connections may be employed, if desired.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

In a reversing mechanism, a shaft, opposing friction-clutches mounted thereon and each comprising outer and inner members, said outer members each having a hub rotatable upon the shaft and having a power-transmission element at its outer end and a circular plate at its inner end, said plates being formed with inwardly-extending annular flanges, each of said inner clutch members having a hub, rotatable upon said shaft and having at its outer end a circular plate formed with an inwardly-extending annular flange, the flanges on the inner clutch members being disposed within the flanges on the outer clutch members and having radially-disposed guide-apertures formed therein, a friction-sleeve slidably and rotatably mounted upon said shaft intermediate the clutches and having enlarged ends formed with sockets to slide upon the hubs of the inner clutch members, links connected to the ends of said sleeves, friction-blocks connected to said links and projecting through and slidable in the guide-apertures in the flanges of the inner clutch members, and means for shifting said sleeve to simultaneously throw one of the clutches into operation and the other out of operation, substantially as described.

In testimony whereof I have hereunto set my hand in presence of two subscribing witnesses.

JOHN C. METCALF.

Witnesses:
J. C. RANKIN,
D. B. GROSH.